US011327804B2

(12) United States Patent
Moustafa et al.

(10) Patent No.: US 11,327,804 B2
(45) Date of Patent: May 10, 2022

(54) SYSTEMS, METHODS AND APPARATUS FOR DYNAMIC DISTRIBUTION IN AUTONOMOUS DRIVING

(71) Applicant: Intel Corporation, Santa Clara, CA (US)

(72) Inventors: Hassnaa Moustafa, Portland, OR (US); Soo Jin Tan, Shanghai (CN); Valerie Parker, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 34 days.

(21) Appl. No.: 16/756,287

(22) PCT Filed: Dec. 29, 2017

(86) PCT No.: PCT/CN2017/120086
§ 371 (c)(1),
(2) Date: Apr. 15, 2020

(87) PCT Pub. No.: WO2019/127450
PCT Pub. Date: Jul. 4, 2019

(65) Prior Publication Data
US 2020/0301743 A1    Sep. 24, 2020

(51) Int. Cl.
*G06F 9/50* (2006.01)
*G05D 1/02* (2020.01)

(52) U.S. Cl.
CPC ......... *G06F 9/5044* (2013.01); *G05D 1/0221* (2013.01); *G06F 9/505* (2013.01); *G06F 9/5077* (2013.01); *G06F 9/5083* (2013.01)

(58) Field of Classification Search
CPC ...... G06F 9/5044; G06F 9/505; G06F 9/5077; G06F 9/5083; G05D 1/0221; G06N 20/00
See application file for complete search history.

(56) References Cited

U.S. PATENT DOCUMENTS

2013/0132967 A1    5/2013  Soundararajan et al.
2016/0347326 A1*  12/2016  Iwagami ............. B60W 50/023
(Continued)

FOREIGN PATENT DOCUMENTS

CN    105807784 A    7/2016
WO    2017171909 A1   10/2017

OTHER PUBLICATIONS

Written Opinion and International Search Report dated Sep. 29, 2018, to PCT Application No. PCT/CN2017/120086.

*Primary Examiner* — Sisley N Kim
(74) *Attorney, Agent, or Firm* — Spectrum IP Law Group LLC (57) ABSTRACT

The disclosed embodiments generally relate to methods, systems and apparatuses for directing Autonomous Driving (AD) vehicles. In one embodiment, an upcoming condition is assessed to determine the computational needs for addressing the condition. A performance value and latency requirement value are assigned to the upcoming condition. A database of available nodes in the network is then accessed to select an optimal node to conduct the required computation. The database may be configured to maintain real time information concerning performance and latency values for all available network nodes. In certain embodiments, all nodes are synchronized to maintain substantially the same database.

25 Claims, 8 Drawing Sheets

(56) References Cited

U.S. PATENT DOCUMENTS

2017/0131727 A1\* 5/2017 Kurdi ..................... G06Q 50/00
2017/0322870 A1\* 11/2017 Hotra .................. G06F 11/3664
2017/0323235 A1 11/2017 Johnston et al.
2018/0109590 A1\* 4/2018 Rao ....................... G06F 9/5077

\* cited by examiner

SYSTEMS, METHODS AND APPARATUS FOR DYNAMIC DISTRIBUTION IN AUTONOMOUS DRIVING

The instant specification claims priority to the PCT Application No. PCT/CN2017/120086 (filed Dec. 29, 2017).

FIELD

The present disclosure generally relates to autonomous driving vehicles. Specifically, an embodiment of the disclosure relates to dynamic distribution of computational requirements for operating an autonomous vehicle.

BACKGROUND

Autonomous Driving (AD) vehicles bring a new ecosystem with new requirements on the cloud and the network architecture. AD vehicles are new sources of data generation and consumption with huge increase in the amount of data, full reliance on the cloud model would not scale. Full reliance on the cloud model does not scale and there is a need to stretch the cloud resources to the network edge and infrastructure as well as to the vehicles themselves. These resources are essential when it comes to providing data analytics/machine learning and applying these tools to the AD vehicles based on different use cases. Some vital use cases include: Dynamic HD Maps, Smart City parking services and Entertainment. Each use case may be defined by one or a set of computational requirements.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Conventional techniques for dynamic compute distribution in autonomous driving (AD) takes place in isolated and static fashion. That is, the vehicle runs some of the compute/analytics, the network edge through mobile or multi-access edge computing (MEC) provides compute capabilities in a standalone manner and the cloud works as an aggregator for long term storage as well as heavy compute and training for machine learning models. The conventional model is unsustainable with the unexpected volume of data of diverse types from/to AD vehicles. The so-called resource virtualization model, though in place and efficient, is still applied in a standalone manner (separately on each server). The resource virtualization model is less efficient as the loads and types of services among servers are not equally-distributed especially when come to high demand verticals like AD which requires low latency response in a lot of its use cases. The conventional solutions look at virtualization separately per machine/server and seek compute partition from the vehicle to the cloud in a disconnected manner. The conventional solutions do not consider these compute capabilities as one pool of resources.

In certain embodiments, the disclosure presents a solution to abstract (or combine) resources from the vehicle to the cloud considering the in-vehicle platform, the network edge platforms and the cloud platforms as one pool of resources. In one embodiment, the usage of the combined resources is virtualized to fit the application needs.

In still other embodiments, the disclosure presents a dynamic model for machine learning workload distribution where a pool of resources is created among different nodes covering in-car, Edge Computing platforms at the network edge (MEC) and DC to satisfy the AD use cases based on latency and real-time requirements and make efficient use of resources. In one embodiment, an MEC or DC may serve multiple AD vehicles. Available AI and Machine Learning central processing unit (interchangeably, processors) include, for example, an embodiment of the disclosure incorporates these AI CPU to be connected together and work seamlessly together when used in an end-to-end (e2e) AD solution. The disclosed embodiments are wireless and wired-line agnostics.

Further, the disclosed embodiments provide a stronger adherence among all AI processors to deploy AI or machine learning applications to provide e2e solutions from in-vehicle, Network Edge to Data Center. In certain embodiments, 5G Cellular-V2 X (C-V2 X) connectivity may be used to connect the disclosed architecture to provide an e2e solution in AD.

Figure 1:
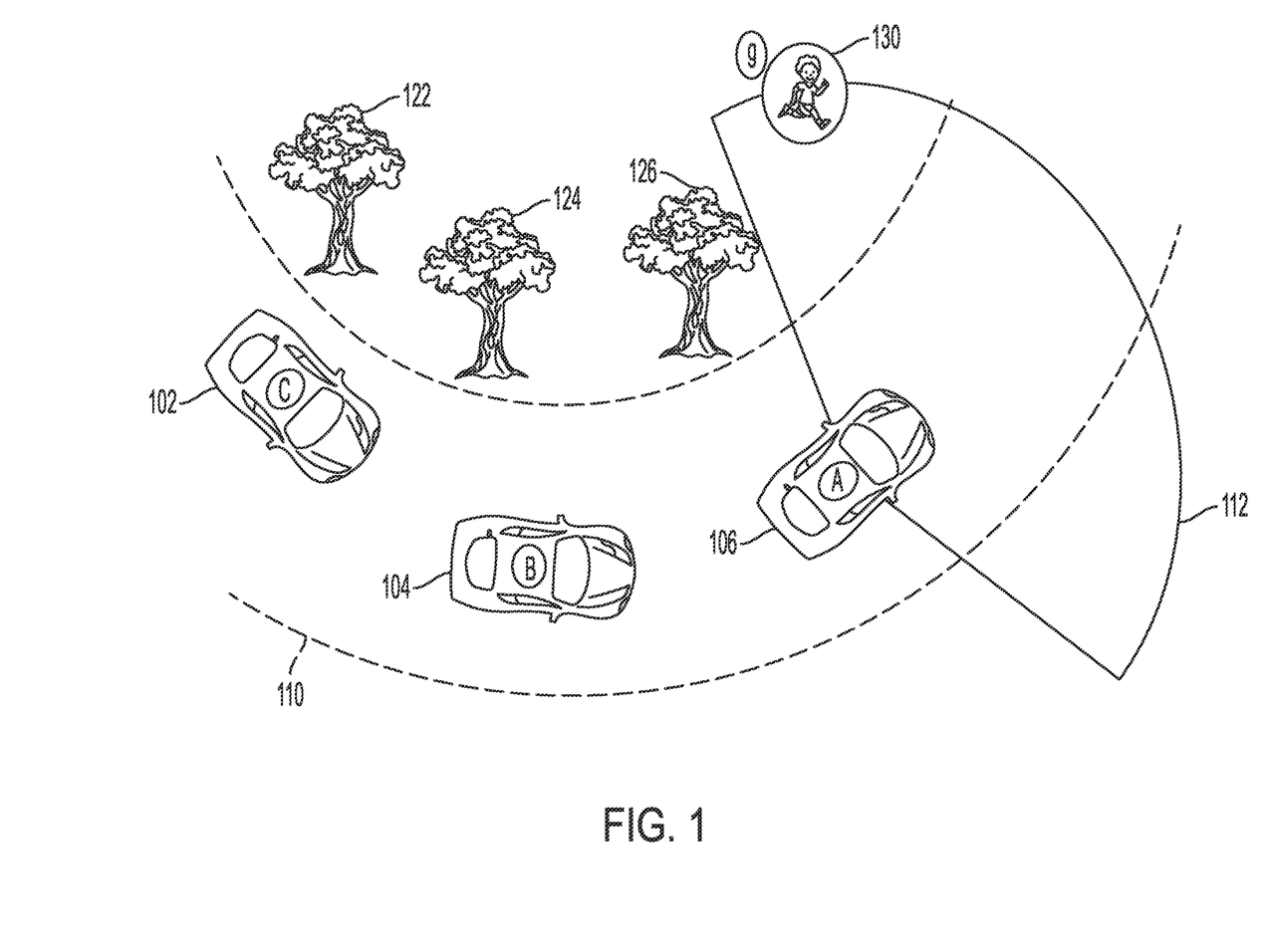
FIG. 1 schematically illustrates an exemplary architecture for Dynamic Load Balancing according to one embodiment of the disclosure.

FIG. 1 schematically illustrates an exemplary architecture for dynamic load balancing according to one embodiment of the disclosure. Vehicle 105 may comprise an autonomous driving vehicle. Operation of the AI for AD 105 requires significant calculations and consumes extensive compute bandwidth. The computation can provide services such as navigation, breaking, steering obstacle avoidance, maneuvering, etc. Implementing all such computation in real time at AD 105 would far exceed the available bandwidth. Architecture 100 of FIG. 1 shows a system having dynamically distributed load balancing for compute needs of AD vehicle 105.

In FIG. 1 compute load is balanced between at least three sources: vehicle Machine Learning (ML) node 105, MEC node 120 and Data Center (DC) node 140. DC node 140 may comprise cloud computing. Vehicle ML node 105 and MEC node 120 may be connected through wireless connection. In one embodiment, 5G wireless connection is used to connected vehicle ML node 105 and MEC node 120. The MEC node 120 and DC node 140 may be connected through a wired backhaul network as shown. It should be noted that while FIG. 1 shows dynamic load balancing between three resources, the disclosed principles are not limited thereto. Dynamic load balancing may be distributed to more or less than three nodes without departing from the disclosed principles.

AD vehicle 105 comprise AI CPU 111. CPU 111 may comprise conventional hardware, software and combination of hardware and software (e.g., firmware) configured for the AI processing and communication described below. In one exemplary embodiment, AI CPU 111 includes processing circuitry (e.g., processors) and memory circuitry to communicate with the processing circuitry. Exemplary AI CPUs include Intel® Xeon Phi™ Processor, FPGA, Xeon FPGA/MCP and Lake Crest chip, all of which are introduced by Intel® Corp. of Santa Clara, Calif.

Multi-access edge computing (MEC) 120 may define any edge computing to optimize cloud computing performing data processing at the network edge near the data source. An exemplary MEC may provide compute capabilities in a standalone manner. MEC may comprise a network-type architecture to enable cloud computing capabilities and an IT service environment at the edge of the cellular network. MEC 120 is logically proximal to vehicle 105 and may wirelessly communicate with AD vehicle 105. MEC 120 includes AI CPU 121, which may define an AI CPU as described above. CPU 121 comprises Micromachine 122. Micromachine 122 may comprise processing circuitry (not shown) and memory circuitry 124.

Data Center (DC) 140 may comprise a network of remote servers hosted on the internet to store, manage and process data. DC 140 may comprise a multitude of servers and CPUs configured for exhaustive cloud computing. DC 140 may be connected with MEC 120 through a backhaul line as shown in FIG. 1. DC 120 includes AI CPU 141, which may define an AI CPU as described above. CPU 141 comprises Micromachine 142. Micromachine 142 may comprise processing circuitry (not shown) and memory circuitry 144.

Each of AI CPUs 111, 121 and 141 may comprise AI CPU components similar to those described above. As illustrates in FIG. 1, each of the AI CPUs 111, 121 and 141 comprises a micromachine circuitry (i.e., 112, 122 and 142, respectively). Each micromodule may define one or more unique register spaces that record the available amount of resources and response time (Latency). The available resource and latency may be obtained in real time and continually updated. This information reflects resource and response time available to the respective CPU. In one embodiment, the available resources may be measured as the number of floating point operations per second (FLOPS) to render a measure of the CPU's performance. In an alternative embodiment, available resources may be measured as a measure of instructions per second. In another embodiment, CPU response time may be quantified by a latency value. A CPU's latency may be affected by the number of factors including resource availability and traffic. In one embodiment, each Micromodule across CUs will always in communication, and thereby synchronized, with the other CPUs in the system. Synchronization may be done at the application level protocol such as message bus to ensure that all Micromodules are always synchronized and in communication with each other.

In FIG. 1, Each Micromodule 112, 122 and 142 further comprises Orchestrator 113, 123 and 142, respectively. The Orchestrator may comprise one or more processing circuitry and memory circuitry. Each Orchestrator 113, 123 and 143 may gather and stores its respective CPU's performance information. This step may be implemented in real-time so that the information is the current. For example, CPU 111 includes Orchestrator 113 which gathers and stores FLOPS (X) and Latency (A) at register 114; CPU 121 includes Orchestrator 123 which gathers and retain FLOPS (Y) and Latency (B) at register 124; and CPU 141 includes Orchestrator 143 which gathers and retain FLOPS (Z) and Latency (C) at register 144.

Each Orchestrator may communicate with one or all other Orchestrators using wireless or landline communication. Thus, each Orchestrator may retain real-time performance and latency information pertaining its own performance as well as all other nodes in the system. In this manner, Orchestrators 112, 122 and 143 remain synchronize. In one embodiment, the synchronization is done based on the application level protocol such as message bus to ensure these micro modules are always in sync or in communications. In another embodiment, only the micromodule communicates.

In one embodiment, the Orchestrator conducts service discovery to detect and identify available compute nodes in system 100. The available AD nodes may be dedicated resources or available resources for use in AD vehicle use.

As illustrated in FIG. 1, each Orchestrator 113, 123 and 143 may communicate with a database that stores information relating to compute resources and response time of each node (i.e., vehicle 105, MEC 120 and DC 140). When AD vehicle 105 attempts to start the execution for any service or use case, Orchestrator 113 immediately makes an analysis and decide how it should distribute the compute workload for the learning and response. Orchestrator 113 has at its disposal real time info of all node resources in its database as illustrated by data table 107. Based on the available information at table 107, AD vehicle 107 can determine how to distribute the compute load for the AD vehicle. It should be noted that table 107 is available to each of nodes 105, 120 and 140. For simplicity, however, table 107 is shown only in relation to AD vehicle node 105.

In certain embodiments, when AD vehicle 105 attempts to start the execution for any service or use case, Orchestrator 113 will immediately make an analysis and decides how it should distribute the workload for machine learning and response. This is because it has the real-time info of all the AI resources in database table 107. For example, if the required computation requires immediate attention and the other nodes show long latency or insufficient FLOPS, CPU 111 (through Orchestrator 113) may assume the responsibility for the calculation. If the required computation allows longer response time, ML node 105 may request one of MEC node 120 or DC node 140 to conduct the computation and report back. The decision as to which node may conduct the required computation may be assessed by Orchestrator 123 based on available information at table 107.

In one embodiment of the disclosure, each of nodes 105, 120 and 140 may substantially simultaneously receive indication of the upcoming computer request. For example, if an AD vehicle use case is for a decision that requires delayed decision (e.g., upcoming traffic detour), one of Orchestrators 123 or 143 may take charge of distributed computation. In one embodiment, only orchestrator is the master at any given time.

Figure 2:
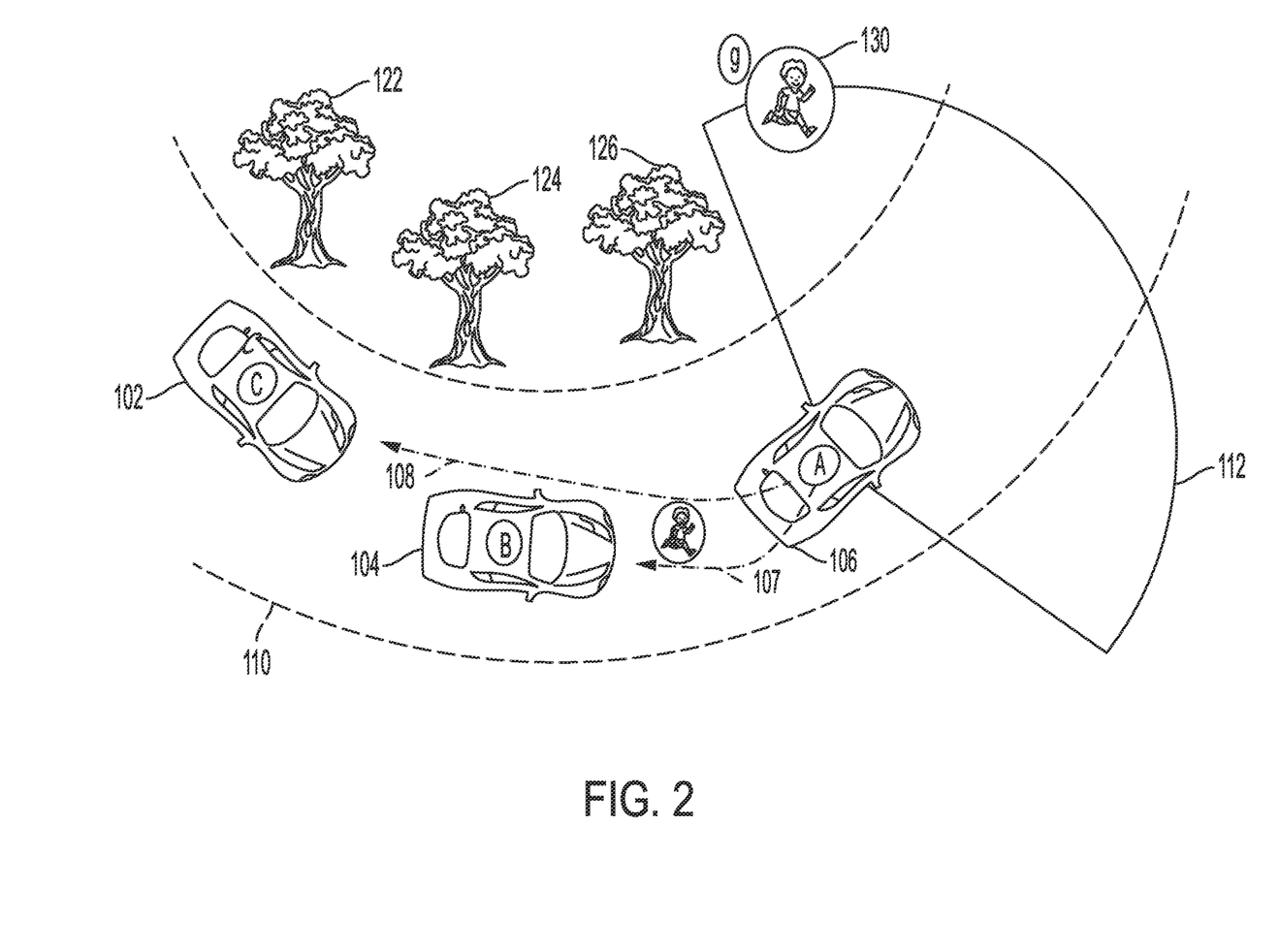
FIG. 2 schematically illustrates an exemplary application of AD vehicle use case for a road hazard awareness computation according to one embodiment of the disclosure.

FIG. 2 schematically illustrates an exemplary application of AD vehicle use case for a road hazard awareness computation according to one embodiment of the disclosure. Specifically, the use case of FIG. 2 shows vehicle 205 at location 201. A road hazard is detected by the system at location 202 along the road and ahead of location 201. The system of FIG. 2 is similar to that of FIG. 1 in that AD vehicle nodes 207, MEC nodes 220 and DC nodes 240 are in communication with each other. Here, in-vehicle CPU 207 receives one or more messages that road construction is ahead at location 202 along the route. Micromodule 212 of CPU 211 may then analyze in real time how much compute (FLOPS) and response time (latency) is required to inform AD vehicle's routing, speed, breaking, etc. ML node 207 includes a table of available FLOPS and latency for each of nodes 207, 220 and 240. Assuming for this use case that equations (1) and (2) holds:

$$FLOPS < X \tag{1}$$

$$latency < A \tag{2}$$

Given the data available at Table 207 to orchestrator 213, the ML node may optimally attend to the required computation and direct AD vehicle 205 through its execution. By way of example, ML node 207 may direct AD vehicle 205 to slow down immediately (and stop if necessary) when approaching location 202.

In one embodiment of the disclosure an Orchestrator may delegate compute assignments based on threshold inquiry. For example, an Orchestrator may delegate computation requirements for an upcoming AD use case to the node that has a latency value that does not exceed the use case's latency requirement and where the node has performance value at least equal to or exceeding the first use case performance requirement.

In another embodiment, the Orchestrator may select a node where the FLOPS requirement is not readily satisfied by the latency is such that the AD computation may be completed before action is necessary. In still another embodiment, an Orchestrator (e.g., MEC Orchestrator) may negotiate with another Orchestrator (e.g., DC Orchestrator) to expedite the required computation or conduct the computation ahead of its natural queue. In still another embodiment, two or more Orchestrator may divide a compute task among themselves. In such cases, the Orchestrators work in a so-called task-split fashion (e.g., object classification may be a task and object recognition may be another task.)

The coordination and synchronization among the nodes (optionally, via micro modules) allows better allocation of the resources to process use case tasks while freeing up other nodes for other use cases.

Figure 3:
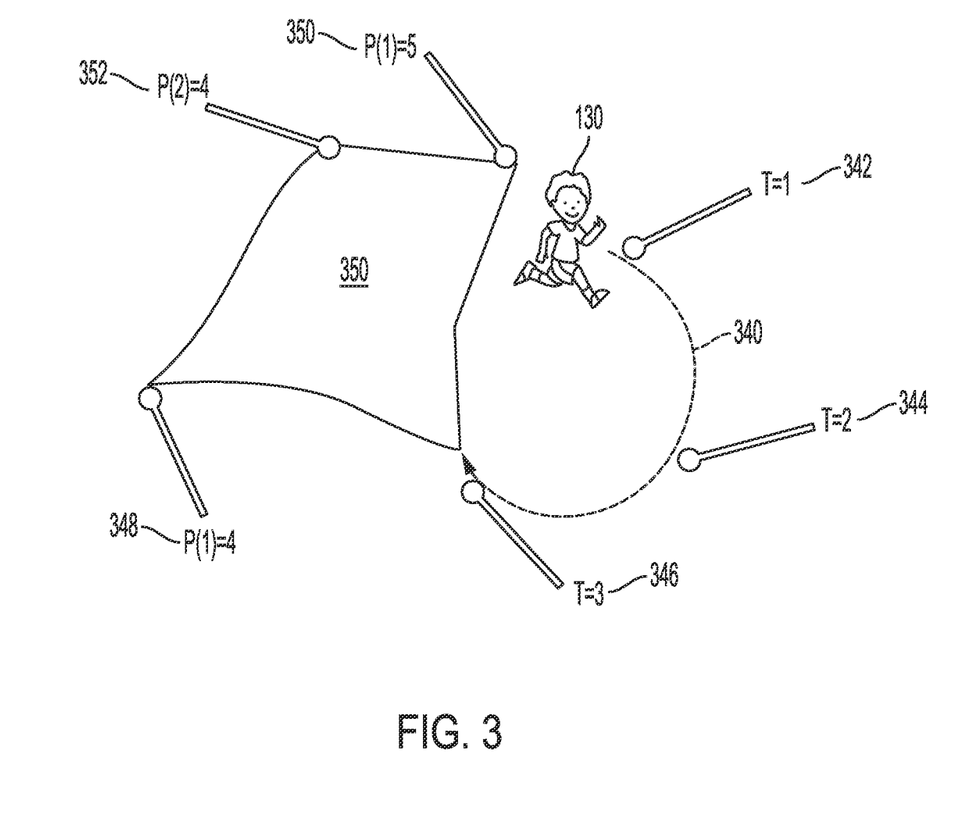
FIG. 3 schematically illustrates an exemplary application of AD vehicle use case for multiple hazard awareness computation according to one embodiment of the disclosure.

FIG. 3 schematically illustrates an exemplary application of AD vehicle use case for multiple hazard awareness computation according to one embodiment of the disclosure. Here, several computational analysis and decisions must be made. The different computation analysis may be done substantially simultaneously or sequentially. If the AD vehicle requires immediate action, the computation may be sourced to the fastest available computation node. If the AI) vehicle requires action which is eminent but not immediate, the computation may be sourced to one or more nodes capable of performing the computation task in due course. In certain embodiment, the computation task may be divided, and each portion may be directed to a different node. The resulting computations may be recombined (at a master node) and the result directed to the AD vehicle.

In FIG. 3, AD vehicle 305 faces an immediate action/ computation need for passing truck 301 at location 302. On-coming truck 304 is further away from AD vehicle 305 and is coming toward the AD vehicle 305. Trucks 301 and 304 may be AD vehicles. Truck 305 may be approaching AD vehicle 305 at high rate of speed. Additional computation and action may be required from AD 305 for approaching truck 305. Moreover, any action/computation with respect to passing truck 301 may require additional action/computation in view of truck 304.

According to one embodiment of the disclosure, micromodule 312 determines that two computational analysis may be needed. The computational analysis may be characterized by Equations (3) and (4):

$$X < FLOPS < Y \tag{3}$$

$$A < Latency < B \tag{4}$$

in Equations (3) an (4), FLOPS may represent total required FLOPS for computations at both locations 302 and 306. In the event that both actions are computed in one event, then the optimal node may be selected from among the various available nodes. In view of Equations (3) and (4), the decision may be to offload the processing to processing will be offloaded to the network edge or MEC 320.

Alternatively, the sequential actions may be implemented separately. Under this condition, CPU 311 may conduct the immediate action (i.e., passing vehicle 301 at location 302) and another node CPU (e.g., MEC 320 or DC 340) may conduct the subsequent action (i.e., dealing with oncoming truck 304). In certain embodiments, multiple computation may be implemented for redundancy and reliability. In such circumstances, more than on computation center will compute independently and communicate to other nodes. A final node may then communicate the result to the AD vehicle.

In certain circumstances where more than one node is capable and available to complete a task, different options may be implemented. For example, multiple computation tasks may be implemented for redundancy and reliability. Alternatively, MEC and vehicle resources may be reserved, and the task may be delegated. In this manner, the vehicle resources and/or MEC may be reserved for other critical activities.

In another exemplary implementation, if a node assigns computation to another node, the assigned node may respond directly to the vehicle or to the assigning node. In one embodiment, if ML node assigns the computation to the DC node, the DC node may respond back to ML node as the ML node. The ML node is already synched with others through the orchestrator.

In certain embodiments, an algorithm may be devised and applied to make the required computation/decision. For example, an algorithm may be configured to offload calculation Whenever possible so as to allow the AD vehicle (ML node 307) to address only the most immediate computations. Such algorithm may be implemented on hardware, software or a combination of hardware and software. In certain embodiments, the initial decision as to where to compute may be made at the ML node. In other embodiments, the initial decision as to where to compute may be made at the MEC node. In still other embodiments, the initial decision as to Where to compute may be made at the DC node.

When other nodes do not provide a micromodule, the AD vehicle may rely on its own ML node to compute the tasks. Where offloading option exists, without the proposed the micromodules (or other similar component) may apply the disclosed principles to provide flexibility and speed. The disclosed embodiments allow dynamic ML resource allocation and create cohesion among and between the available CPUs.

Figure 4:
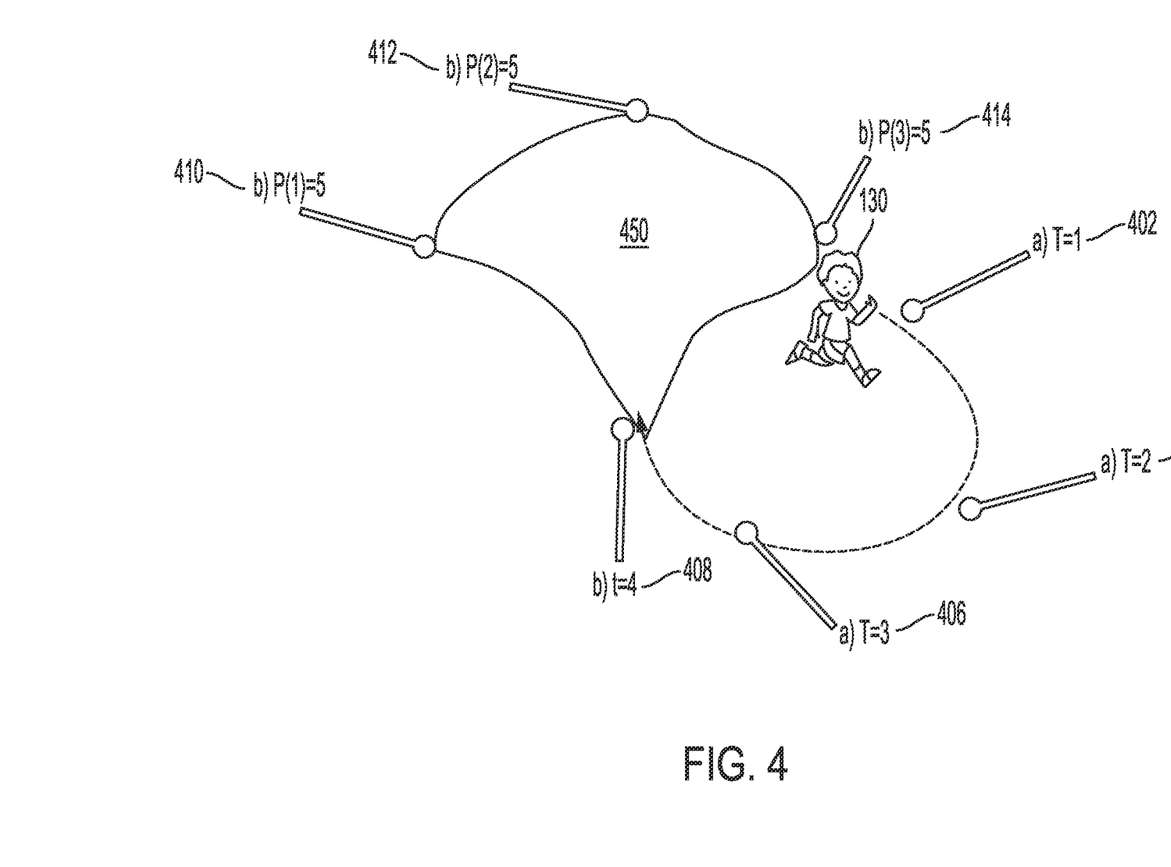
FIG. 4 illustrates an exemplary flow diagram for implementing a method according to one embodiment of the disclosure.

FIG. 4 illustrates an exemplary flow diagram for implementing a method according to one embodiment of the disclosure. The flow diagram steps need not be implemented in the sequence presented in FIG. 4 and may be implemented in a different sequence without departing from the disclosed principles. The flow diagram of FIG. 4 may be implemented at any AI node associated with an AD vehicle. The implementation may be independent of all other associated nodes. That is, each node may independently implement the flow diagram (or permutations thereof). Some exemplary and non-exclusive nodes include the vehicle's own ML node, the MEC node and the cloud DC. The flow diagram of FIG. 4 may be initiated at step 400. Step 400 may be caused by starting the vehicle. Step 400 may also be caused by a change in the vehicle's environment or operation. In certain embodiments, the flow diagram of FIG. 4 may be iterative, and the process of FIG. 4 may be repeated at a desired frequency and intervals.

At step 402, all or some of the other AI nodes associated with the AD vehicle are identified. In one implementation, a service search and discovery technique may be used to identify the other AI nodes. In one implementation, each node seeking discovery uses its communication platform to discover and engage other nodes. The nodes may communicate with each other through wireless or landline connections.

At step 404, each node conducts self-assessment to quantify and assign a performance value and a latency value to its processing capability. In one embodiment, the self-assessment values reflect real time performance of the AI node. The performance may be quantified as FLOPS and latency may be measured in nan-seconds or mili-seconds. The performance value and the latency values may be stored at a database (e.g., a table) and updated continually.

At step 406 the nodes identified in step 402 report communicate with each other to report their performance and latency values. Other information may be communicated between the nodes. Each node may update its local database (e.g., table) to include all other nodes' values and communicated information as shown in step 406.

At step 408, one or more nodes receives a use case for an associated AD vehicle. The use case may define certain required computation for the AD vehicle. A use case may be, for example, a machine learning workload for the AD vehicle, such as, information about breaking, accelerating or upcoming objects or obstacles.

At step 410, performance value and the latency requirement for the case use's computational requirement are assessed. The performance value may be estimated as a FLOPS value required to complete the computation. The latency value may be determined in view of many factors. For example, if the AD vehicle is traveling at 70 mph towards and obstacle a mile away, the latency value may be determined as a function of speed and distance.

At step 412, the performance value and latency requirements are compared with the values stored at the database and selection is made as to the optimal node for conducting the computation. While the disclosed embodiments disclose exemplary performance and latency values, additional criteria may be used in determining an appropriate node. Other criteria may include use criteria, for example, if there a need to run the application at the time, the location of the client, user experience, cost, size of the application, or priority.

At step 414, the use case computation is assigned to the selected node. In one embodiment, the selected node completes the computation and responds directly to the AD vehicle. In another embodiment, the selected node completes the computation and communicates the results to one or more nodes, which may in turn, report relay the results to the AD vehicle. In still another embodiment, the selected node updates its expected performance and latency value in view of the pending tasks and reports the updates values to all other nodes. Thus, a subsequent use case may be assigned to a different node if the assigned node's performance and latency values are below the required threshold.

Figure 5:
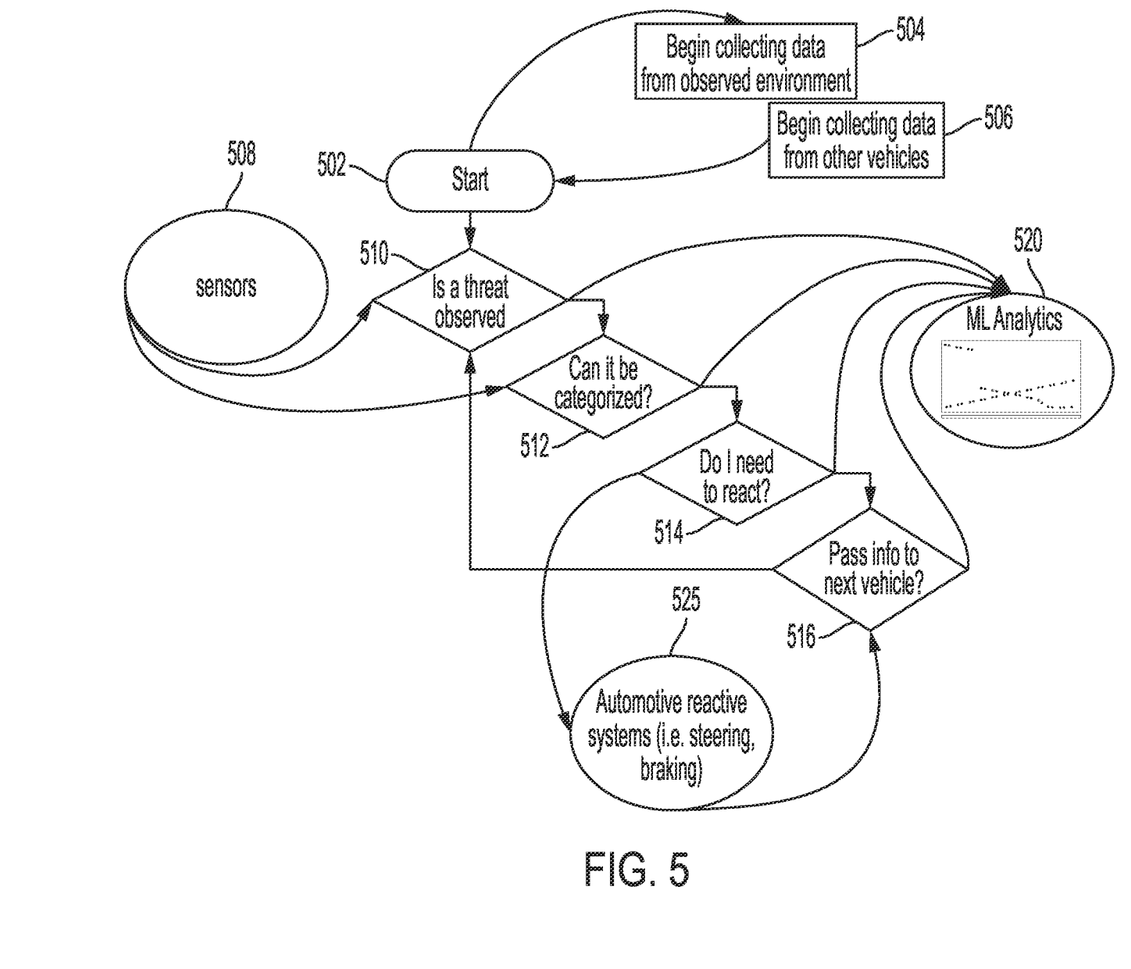
FIG. 5 illustrates an exemplary apparatus according to one embodiment of the disclosure.

FIG. 5 illustrates an exemplary apparatus according to one embodiment of the disclosure. Apparatus 500 of FIG. 5, may comprise hardware, software or a combination of hardware and software programmed to implement steps disclosed herein, for example, the steps of flow diagram of FIG. 4. In one embodiment, apparatus 500 may comprise an AI CPU. For example, apparatus 500 may be a ML node, an MEC node or a DC node. In one exemplary embodiment, CPU 500 may be implemented at an AD vehicle. At another exemplary embodiment, CPU 500 may define an ML node executed external to the vehicle.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Apparatus 500 comprise communication module 510. The communication module may comprise hardware and software configured for landline, wireless and optical communication. For example, communication module 510 may comprise components to conduct wireless communication, including WiFi, 5G, NFC, Bluetooth, Bluetooth Low Energy (BLE) and the like. Micromodule 520 may comprise processing circuitry required to implement one or more steps illustrates in FIG. 4. Micromodule 520 may include one or more processor circuitries and memory circuities. In the embodiment of FIG. 5, Orchestrator 530 is illustrated as part of Micromodule 520. It should be noted that the representation of FIG. 5 is exemplary and non-limiting. In one embodiment (not shown), Orchestrator 530 may be configured separately from Micromodule 520. Micromodule 520 and Orchestrator 530 may communicate with memory 540. Memory 540 may store one or more tables indicating performance and latency of CPU 500 and other CPUs in communication therewith.

In certain embodiments, Micromodule 520 defines a set of register spaces that record the amount of resources (FLOPS) and response time (latency) for CPU 500. In certain embodiments, Micromodules of different ML CPUs are in constant communication with each other and update each other with real time data on available performance and latency. The synchronization may be implemented based on the application level protocol, such as, message bus to ensure that Micromodules are always in sync or in communication with each other.

In certain embodiments, Orchestrator 530 conducts service discovery (in connection with communication module 510) to find out how many compute nodes are available for use with the case use compute requirements of an associated AD vehicle (not shown). Once the candidate compute nodes are identified, performance and latency values for each compute node is gathered and stored at database 540. In one embodiment, the gathered values reflect real time performance and latency value for each respective ML CPU node.

Figure 6:
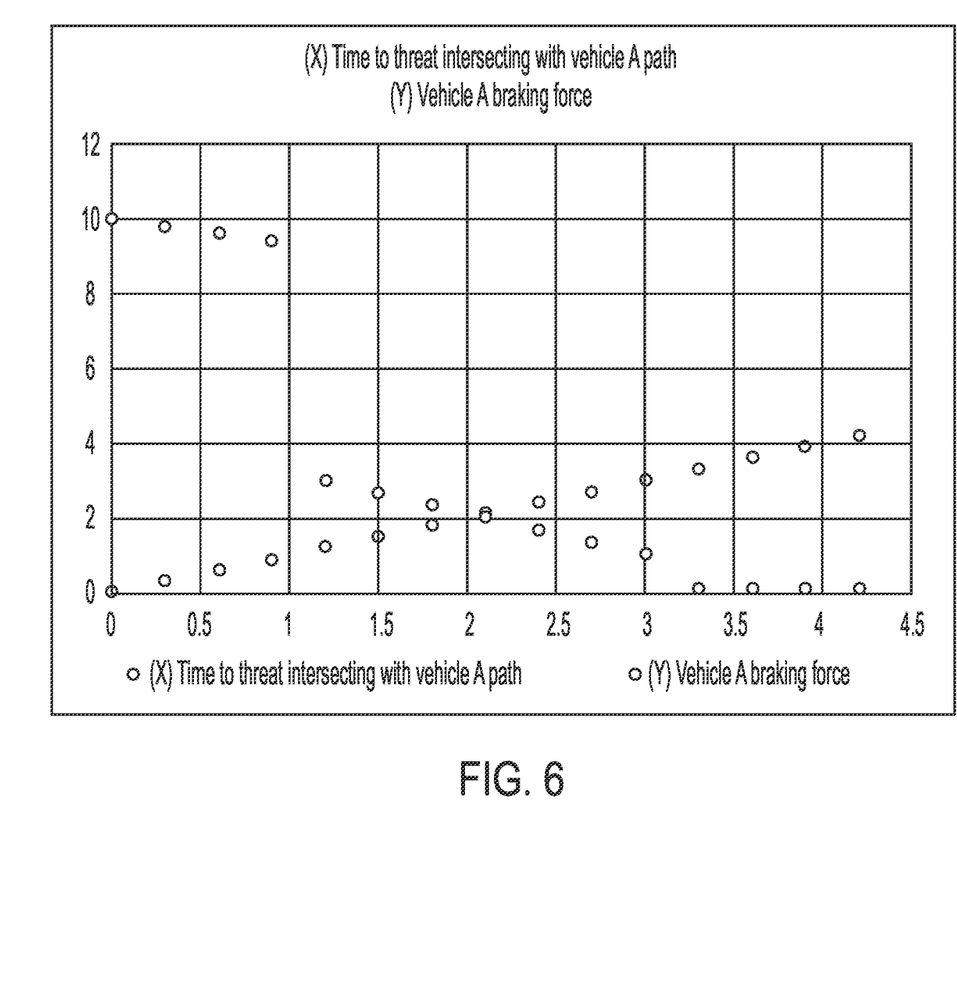
FIG. 6 is a schematic block diagram illustration of components of a communication component in accordance with one or more exemplary embodiments disclosed herein.

FIG. 6 is a schematic block diagram illustration of components of a communication component in accordance with one or more exemplary embodiments disclosed herein. Specifically, FIG. 6 may represent a component of a wireless device as used in CPU 500 of FIG. 5. Communication component 600 may be used for landline or wireless communication. Component 600 may include application circuitry 602, baseband circuitry 604, Radio Frequency (RF) circuitry 606, front-end module (FEM) circuitry 608 and one or more antennas 610, coupled together at least as shown.

Application circuitry 602 may include one or more application processors. For example, application circuitry 602 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 604 may include circuitry such as, but not limited to, one or more single-core or multi-core processors. Baseband circuitry 604 may include one or more baseband processors and/or control logic to process baseband signals received from a receive signal path of RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or one or more other baseband processors 604d for other existing generations, generations in development or to be developed in the future, for example fifth generation (5G), sixth generation (6G), and so on. Baseband circuitry 604, for example one or more of baseband processors 604a through 604d, may handle various radio control functions that enable communication with one or more radio networks via RF circuitry 606. The radio control functions may include, but are not limited to, signal modulation and/or demodulation, encoding and/or decoding, radio frequency shifting, and so on. In some embodiments, modulation and/or demodulation circuitry of baseband circuitry 604 may include Fast-Fourier Transform (FFT), precoding, and/or constellation mapping and/or demapping functionality. In some embodiments, encoding and/or decoding circuitry of baseband circuitry 604 may include convolution, tail-biting convolution, turbo, Viterbi, and/or LowDensity Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 604 may include elements of a protocol stack such as, for example, elements of an evolved universal terrestrial radio access network (EUTRAN) protocol including, for example, physical (PRY), media access control (MAC), radio link control (RLC), packet data convergence protocol (PDCP), and/or Radio Resource Control (RRC) elements. Processor 604e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 604f. The one or more audio DSPs 604f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 604 and application circuitry 602 may be implemented together such as, for example, on a system on a chip (SOC).

In some embodiments, baseband circuitry 604 may provide for communication compatible with one or more radio technologies. For example, in some embodiments, baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. En various embodiments, RF circuitry 606 may include switches, filters, amplifiers, and so on, to facilitate the communication with the wireless network. RF circuitry 606 may include a receive signal path which may include circuitry to down-convert RF signals received from FEM circuitry 608 and provide baseband signals to baseband circuitry 604. RF circuitry 606 may also include a transmit signal path which may include circuitry to up-convert baseband signals provided by the baseband circuitry 604 and provide RE' output signals to FEM circuitry 608 for transmission.

In some embodiments, RF circuitry 606 may include a receive signal path and a transmit signal path. The receive signal path of RIF circuitry 606 may include mixer circuitry 606a, amplifier circuitry 606b and filter circuitry 606c. The transmit signal path of RIF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RIF signals received from FEM circuitry 608 based on the synthesized frequency provided by synthesizer circuitry 606d. Amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, mixer circuitry 606a of the transmit signal path may be configured to up-convert input baseband signals based on the synthesized frequency provided by synthesizer circuitry 606d to generate RF output signals for FEM circuitry 608. The baseband signals may be provided by the baseband circuitry 604 and may be filtered by filter circuitry 606c. Filter circuitry 606c may include a low-pass filter (LPF), although the scope of the embodiments is not limited in this respect.

In some embodiments, mixer circuitry 606a of the receive signal path and the mixer circuitry 606a of the transmit signal path may include two or more mixers and may be arranged for quadrature down conversion and/or up conversion respectively. In some embodiments, mixer circuitry 606a of the receive signal path and the mixer circuitry 606a of the transmit signal path may include two or more mixers and may be arranged for image rejection, for example Hartley image rejection. In some embodiments, mixer circuitry 606a of the receive signal path and the mixer circuitry 606a may be arranged for direct down conversion and/or direct up conversion, respectively. In some embodiments, mixer circuitry 606a of the receive signal path and mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 606 may include analog-to-digital converter (ADC) and digital-to-analog converter (DAC) circuitry, and baseband circuitry 604 may include a digital baseband interface to communicate with RF circuitry 606. In some dual-mode embodiments, separate radio integrated circuit (IC) circuitry may be provided for processing signals for one or more spectra, although the scope of the embodiments is not limited in this respect.

In some embodiments, synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

Synthesizer circuitry 606d may be configured to synthesize an output frequency for use by mixer circuitry 606a of RF circuitry 606 based on a frequency input and a divider control input. In some embodiments, synthesizer circuitry 606d may be a fractional N/N+1 synthesizer.

In some embodiments, frequency input may be provided by a voltage controlled oscillator (VCO), although that is not a requirement. Divider control input may be provided by either baseband circuitry 604 or applications processor 602 depending on the desired output frequency. In some embodiments, a divider control input (e.g., N) may be determined from a look-up table based on a channel indicated by applications processor 602.

Synthesizer circuitry 606d of RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

FEM circuitry 608 may include a receive signal path Which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by RF circuitry 606 for transmission by one or more of the one or more antennas 610.

In some embodiments, FEM circuitry 608 may include a transmit/receive (TX/RX) switch to switch between transmit mode and receive mode operation. FEM circuitry 608 may include a receive signal path and a transmit signal path. The receive signal path of FEM circuitry 608 may include a low-noise amplifier (LNA) to amplify received RF signals and to provide the amplified received RF signals as an output, for example to RF circuitry 606. The transmit signal path of FEM circuitry 608 may include a power amplifier (PA) to amplify input RF signals, for example provided by RF circuitry 606, and one or more filters to generate RF signals for subsequent transmission, for example by one or more of antennas 610. In some embodiments, UE device 600 may include additional elements such as, for example, memory and/or storage, display, camera, sensor, and/or input/output (I/O) interface, although the scope of the claimed subject matter is not limited in this respect.

Furthermore, some embodiments may be applied in computing devices that include one or more processors (e.g., with one or more processor cores), such as those discussed with reference to disclosed FIGS. herein, including for example, small form factor or mobile computing devices, e.g., an IoT device, M2M device, a smartphone, tablet, UMPC (Ultra-Mobile Personal Computer), laptop computer, Ultrabook™ computing device, wearable devices (such as a smart watch, smart glasses, etc.), 2 in 1 systems, etc. However, embodiments discussed herein are not limited to mobile computing devices and may be applied in any type of computing device, such as a work station, a server, a super computer, etc. Also, some embodiments are applied in computing devices that include a cooling fan as well as fanless computing devices.

In some embodiments, an IoT device may be utilized. An IoT device may include various components (such as one or more components discussed with reference to the disclosed figures). Also, one or more embodiments may utilize a computing cloud (or more generally a "cloud"). The computing cloud may include various types of computing devices. These devices may be in digital communication via a cellular communication channel, a computer network, and/or the Internet. Also, one or more of the components discussed herein can be embodied as a System-On-Chip (SOC) device.

Figure 7:
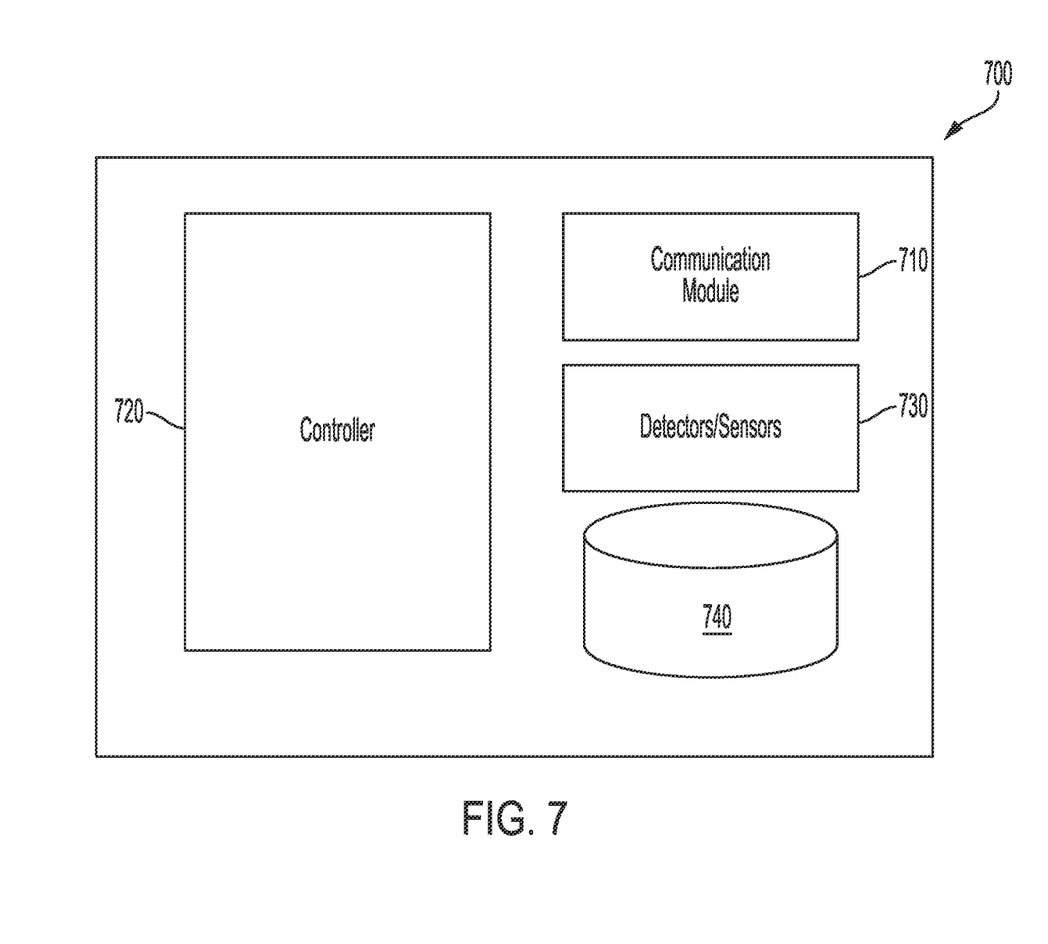
FIG. 7 illustrates a block diagram of an embodiment of a computing system, which may be utilized in various embodiments discussed herein.
Figure 8:
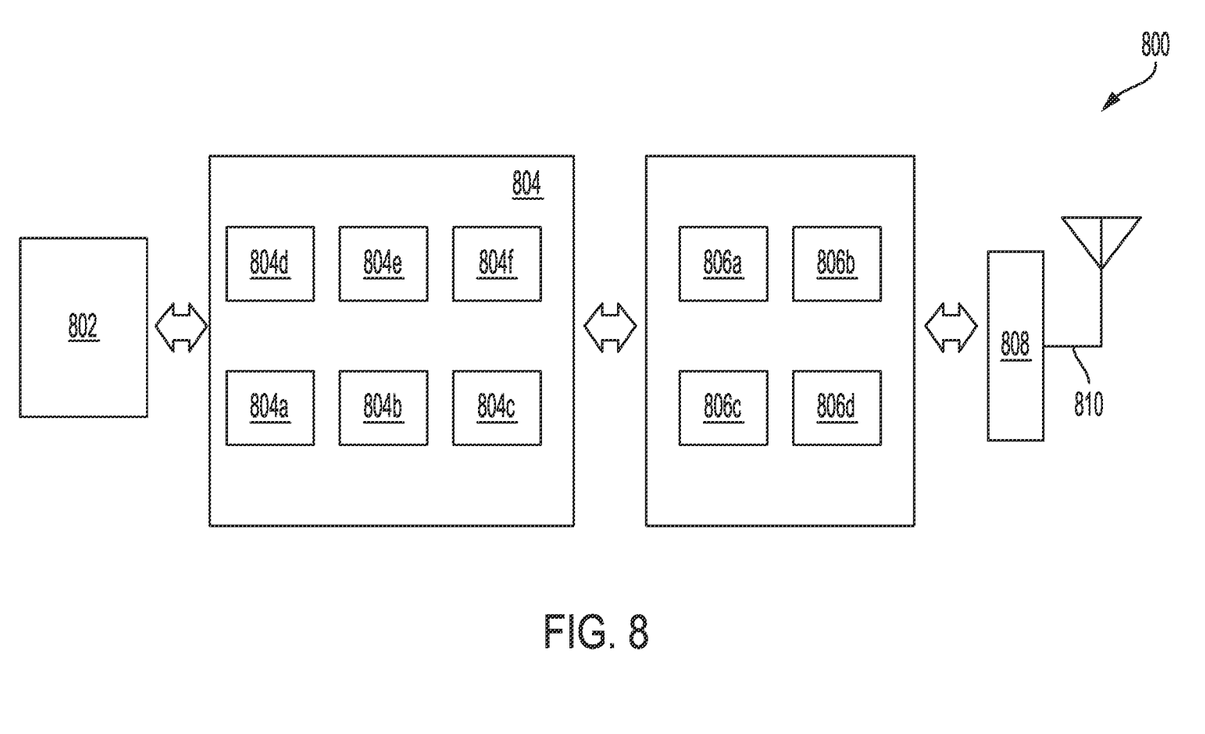
FIG. 8 is a block diagram of a processing system according to an embodiment of the disclosure.

FIG. 7 illustrates a block diagram of an SOC package in accordance with an embodiment. As illustrated in FIG. 8, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. En some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

ADDITIONAL NOTES & EXAMPLES

The following non-limiting embodiments are presented to further illustrates different embodiments of the disclosure Example 1 relates to an apparatus to dynamically allocate computational bandwidth for an autonomous driving (AD) vehicle, the apparatus comprising: a communication module for one or more of wireless and landline communication; a central processing unit (CPU) in communication with the communication module, the CPU to receive an indication of a computational analysis, the CPU further comprising: a micromodule to receive the indication and to assign a threshold performance value and a threshold response latency value to the reeived indication; an Orchestrator configured to determine a first performance value and a first response latency for the CPU, the Orchestrator further configured to discover and communication with an available computational node and to receive from the available computational node a second performance value and a second response latency value; wherein the Orchestrator dynamically determines whether to perform or to delegate the computational analysis as a function of one or more of the threshold performance value and the threshold response latency value.

Example 2 relates to the apparatus of example 1, wherein the Orchestrator is configured to delegate the computational analysis in response to a comparison of one or more of: the second response latency and the threshold response latency, or the second performance value and the threshold performance value.

Example 3 relates to the apparatus of any preceding claim, wherein the Orchestrator is configured to perform the computational analysis in response to a comparison of one or more of: the first response latency and the threshold response latency, or the first performance value and the threshold performance value.

Example 4 relates to the apparatus of any preceding claim, wherein the Orchestrator is configured to access a database to store the first and the second performance values as well as the first and the second response latency values.

Example 5 relates to the apparatus of any preceding claim, wherein the Orchestrator updates the database substantially during runtime.

Example 6 relates to the apparatus of any preceding claim, wherein each of the first and the second performance values and each of the first and second latency values are updated substantially during runtime.

Example 7 relates to the apparatus of any preceding claim, wherein the Orchestrator is configured to communicate the first performance and the latency values to a second Orchestrator associated with the available computational node.

Example 8 relates to the apparatus of any preceding claim, wherein the CPU is associated with one of an Autonomous Driving (AD) vehicle, Mobile Edge Compute (MEC) system or a cloud Data Center (DC).

Example 9 relates to at least one machine-readable medium including instructions to dynamically allocate computational bandwidth for an autonomous driving (AD) vehicle, which when executed, causes one or more processors to: identify a plurality of distributed Artificial Intelligence (AI) nodes associated with the AD vehicle; quantifying a performance value and a response latency value for each identified AI node; synchronize the plurality of AI nodes by communicating the quantified performance value and response latency for each identified AI node to at least one other AI node; receive an indication of a computation for the AD vehicle and determining a threshold performance value and a threshold latency requirement for the computation; and delegate the computation to one of the plurality of distributed AI nodes as a function of the performance value and the response latency of the delegated node.

Example 10 relates to the medium of example 9, wherein the instructions further cause the one or more processors to delegate the required computation to a first of the plurality of AI nodes, the first AI node having a latency value not exceeding the threshold latency value, and the first node having a performance value substantially equaling or exceeding the threshold performance value.

Example 11 relates to the medium of any of examples 9-10, wherein the AI nodes comprise AI vehicle computation system, Mobile Edge Compute (MEC) and cloud Data Center (DC) computation and wherein each AI node further comprises an independent central processing unit (CPU).

Example 12 relates to the medium of any of examples 9-11, wherein the instructions further cause the one or more processors to quantify a node performance value as a number of floating point operations per second (FLOPS).

Example 13 relates to the medium of any of examples 9-12, wherein the instructions further cause the one or more processors to conduct service discovery to identify all nodes associated with the AD vehicle.

Example 14 relates to the medium of any of examples 9-13, wherein the wherein the instructions further cause the one or more processors to quantify the performance value and the response latency substantially during runtime.

Example 15 relates to the medium of any of examples 9-14, wherein the instructions further cause the one or more processors to synchronize the plurality of nodes at an application level protocol.

Example 16 relates to the medium of any of examples 9-15, wherein the instructions further cause the one or more processors to store the performance value and response latency value for each identified AI node.

Example 17 relates to a method to dynamically allocate computational bandwidth for an autonomous driving (AD) vehicle, comprising: identifying a plurality of distributed Artificial Intelligence (AI) nodes associated with the AD vehicle; quantifying a performance value and a response latency value for each identified AI node; synchronizing the plurality of AI nodes by communicating the quantified performance value and response latency for each identified AI node to at least one other AI node; receiving an indication of a computation for the AD vehicle and determining a threshold performance value and a threshold latency value for the computation; and delegating the computation to one of the plurality of distributed AI nodes as a function of the performance value and the response latency of the delegated node.

Example 18 relates to the method of example 17, further comprising delegating the required computation to a first of the plurality of AI nodes, the first AI node having a latency value not exceeding the threshold latency value, and the first node having a performance value substantially equaling or exceeding the threshold performance requirement.

Example 19 relates to the method of any of examples 17-18, wherein the AI nodes comprise AD vehicle computation system, Mobile Edge Compute (MEC) and cloud Data Center (DC) computation system and wherein each AI node further comprises an independent central processing unit (CPU).

Example 20 relates to the method of any of examples 18-19, further comprising quantifying a node performance value as a number of floating point operations per second (FLOPS).

Example 21 relates to the method of any of examples 18-20, wherein identifying a plurality of distributed AI nodes further comprises conducting service discovery to identify all nodes associated with the AD vehicle.

Example 22 relates to the of any of examples 18-21, wherein the step of quantifying a performance value and a response latency value for each identified AI node further comprises quantifying the performance value and the response latency value substantially during runtime.

Example 23 relates to the method of any of examples 18-22, wherein the step of synchronizing the plurality of nodes is implemented at an application level protocol.

Example 24 relates to the method of any of examples 18-23, further comprising storing the performance value and response latency value of each AI node.

Example 25 relates to the method of any of examples 18-24, wherein at least one of the plurality of distributed AI nodes associated with the AD vehicle continually communicates with another distributed AI during runtime.

Example 26 relates to a machine-readable medium, which when executed, causes one or more processor to implement steps recited in any of examples 18-25.

Example 27 relates to an apparatus to dynamically allocate computational bandwidth for an autonomous driving (AD) vehicle, comprising: means for identifying a plurality of distributed Artificial Intelligence (AI) nodes associated with the AD vehicle; means for quantifying a performance value and a response latency value for each identified AI node; means for synchronizing the plurality of AI nodes by communicating the quantified performance value and response latency for each identified AI node to at least one other AI node; means for receiving an indication of a computation for the AD vehicle and determining a threshold performance value and a threshold latency value for the computation; and means for delegating the computation to one of the plurality of distributed AI nodes as a function of the performance value and the response latency of the delegated node.

Example 28 relates to the apparatus of example 27, further comprising means for delegating the required computation to a first of the plurality of AI nodes, the first AI node having a latency value not exceeding the threshold latency value, and the first node having a performance value substantially equaling or exceeding the threshold performance requirement.

Example 29 relates to the apparatus of any of examples 27-28, wherein the AI nodes comprise AD vehicle computation system, Mobile Edge Compute (MEC) and cloud Data Center (DC) computation system and wherein each AI node further comprises an independent central processing unit (CPU).

Example 30 relates to the apparatus of any of examples 27-29, further comprising means for quantifying a node performance value as a number of floating point operations per second (FLOPS).

Example 31 relates to the apparatus of any of examples 27-30, wherein means for identifying a plurality of distributed AI nodes further comprises means for conducting service discovery to identify all nodes associated with the AD vehicle.

Example 32 relates to the apparatus of any of examples 27-31, wherein the means for quantifying a performance value and a response latency value for each identified AI node further comprises means for quantifying the performance value and the response latency value substantially during runtime.

Example 33 relates to the apparatus of any of examples 27-32, wherein the means for synchronizing the plurality of nodes is implemented at an application level protocol.

Example 34 relates to the apparatus of any of examples 27-33, further comprising means for storing the performance value and response latency value for each AI node.

Example 35 relates to the apparatus of any of examples 27-34, wherein at least one of the plurality of distributed AI nodes associated with the AD vehicle continually communicates with another distributed AI during runtime.

While the principles of the disclosure have been illustrated in relation to the exemplary embodiments shown herein, the principles of the disclosure are not limited thereto and include any modification, variation or permutation thereof.

What is claimed is:

1. An apparatus to dynamically allocate computational bandwidth for an autonomous driving (AD) vehicle, the apparatus comprising:
   a communication module for one or more of wireless and landline communication;
   a central processing unit (CPU) in communication with the communication module, the CPU to receive an indication of a condition requiring a computational analysis, the CPU further comprising:
      a micromodule to receive the one or more indication and to assign a required performance value and a required response latency value to the received indication;
      an Orchestrator configured to determine a first performance value and a first response latency for the CPU, the Orchestrator further configured to discover and communicate with an available computational node and to receive from the available computational node a second performance value and a second response latency value;
      wherein the Orchestrator dynamically determines whether to perform or to delegate the computational analysis as a function of one or more of the required performance value and the required response latency value.

2. The apparatus of claim 1, wherein the Orchestrator delegates the computational analysis if the second response latency does not exceed the required response latency and if the second performance value is at least equal to or exceeds the required performance value.

3. The apparatus of claim 1, wherein the Orchestrator performs the computational analysis if the first response latency does not exceed the required response latency and if the first performance value is at least equal to or exceeds the required performance value.

4. The apparatus of claim 1, wherein the Orchestrator further comprises a database to store the first and the second performance values as well as the first and the second response latency values.

5. The apparatus of claim 4, wherein the Orchestrator updates the database in real time.

6. The apparatus of claim 1, wherein each of the first and the second performance values and each of the first and second latency values are updated in real time.

7. The apparatus of claim 1, wherein the Orchestrator communicates the first performance and the latency values to an Orchestrator associated with the available computational node.

8. The apparatus of claim 1, wherein the CPU is associated with one of an Autonomous Driving (AD), Mobile Edge Compute (MEC) system or a cloud Data Center (DC).

9. At least one non-transitory machine-readable medium including instructions to dynamically allocate computational bandwidth for an autonomous driving (AD) vehicle, which when executed, causes one or more processors to:

identify a plurality of distributed Artificial Intelligence (AI) nodes associated with the AD vehicle;

quantifying a performance value and a response latency value for each identified AI node;

synchronize the plurality of AI nodes by communicating the quantified performance value and response latency for each identified AI node to at least one other AI node;

receive an indication requiring computation for the AD vehicle and determining a performance value and a latency requirement for the required computation; and delegate the required computation to one of the plurality of distributed AI nodes as a function of the performance value and the response latency of the delegated node.

10. The medium of claim 9, wherein the instructions further cause the one or more processors to delegate the required computation to a first of the plurality of AI nodes, the first AI node having a latency value not exceeding the required computation's latency requirement, and the first node having a performance value at least equal to or exceeding the required computation's performance requirement.

11. The medium of claim 9, wherein the AI nodes comprise AI vehicle computation system, Mobile Edge Compute (MEC) and cloud Data Center (DC) computation and wherein each AI node further comprises an independent central processing unit (CPU).

12. The medium of claim 9, wherein the instructions further cause the one or more processors to quantify a node performance value as a number of floating point operations per second (FLOPS).

13. The medium of claim 9, wherein the instructions further cause the one or more processors to conduct service discovery to identify all nodes associated with the AD.

14. The medium of claim 9, wherein the instructions further cause the one or more processors to quantify the performance value and the response latency in real time.

15. The medium of claim 9, wherein the instructions further cause the one or more processors to synchronize the plurality of nodes at an application level protocol.

16. The medium of claim 9, wherein the instructions further cause the one or more processors to store the performance value and response latency value for each identified AI node.

17. A method to dynamically allocate computational bandwidth for an autonomous driving (AD) vehicle, comprising:

identifying a plurality of distributed Artificial Intelligence (AI) nodes associated with the AD vehicle;

quantifying a performance value and a response latency value for each identified AI node;

synchronizing the plurality of AI nodes by communicating the quantified performance value and response latency for each identified AI node to at least one other AI node;

receiving an indication requiring computation for the AD vehicle and determining a performance value and a latency requirement for the required computation; and delegating the required computation to one of the plurality of distributed AI nodes as a function of the performance value and the response latency of the delegated node.

18. The method of claim 17, further comprising delegating the required computation to a first of the plurality of AI nodes, the first AI node having a latency value not exceeding the required computation's latency requirement, and the first node having a performance value at least equal to or exceeding the required computation's performance requirement.

19. The method of claim 17, wherein the AI nodes comprise AD vehicle computation system, Mobile Edge Compute (MEC) and cloud Data Center (DC) computation system and wherein each AI node further comprises an independent central processing unit (CPU).

20. The method of claim 17, further comprising quantifying a node performance value as a number of floating point operations per second (FLOPS).

21. The method of claim 17, wherein identifying a plurality of distributed AI nodes further comprises conducting service discovery to identify all nodes associated with the AD.

22. The method of claim 17, wherein the step of quantifying a performance value and a response latency value for each identified AI node further comprises quantifying the performance value and the response latency value in real time for each node.

23. The method of claim 17, wherein the step of synchronizing the plurality of nodes is implemented at an application level protocol.

24. The method of claim 17, further comprising storing the performance value and response latency value for each AI node.

25. The method of claim 17, wherein at least one of the plurality of distributed AI nodes associated with the AD vehicle continually communicates with another distributed AI node in real time.

* * * * *